Figure 1:
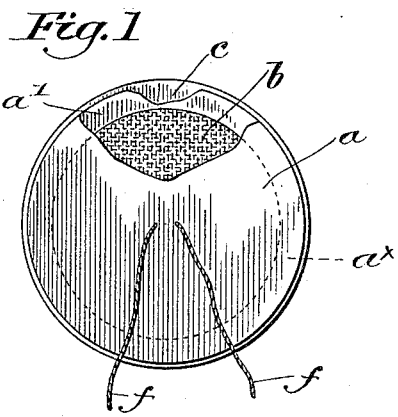

(No Model.)

J. F. REYNOLDS.
DEVICE FOR REPAIRING RUBBER TIRES.

No. 604,636. Patented May 24, 1898.

Witnesses
A. C. Harmon
Walter E. Lombard

Inventor:
James F. Reynolds.
by Crosby & Gregory
attys.

UNITED STATES PATENT OFFICE.

JAMES F. REYNOLDS, OF LYNN, MASSACHUSETTS, ASSIGNOR TO L. C. CHASE & CO., OF BOSTON, MASSACHUSETTS.

DEVICE FOR REPAIRING RUBBER TIRES.

SPECIFICATION forming part of Letters Patent No. 604,636, dated May 24, 1898.

Application filed February 21, 1898. Serial No. 671,056. (No model.)

*To all whom it may concern:*

Be it known that I, JAMES F. REYNOLDS, of Lynn, county of Essex, State of Massachusetts, have invented an Improvement in Devices for Repairing Rubber Tires, of which the following description, in connection with the accompanying drawings, is a specification, like letters on the drawings representing like parts.

This invention has for its particular object the production of efficient means for more perfectly repairing and stopping leaks or punctures in the single-tube tires than has heretofore been accomplished. Temporary repairs have been effected in such cases by the application of a headed plug of vulcanized rubber cemented to the interior of the tire at the leak or puncture, and a so-called "patch" has also been employed to effect a more permanent repair. It is to the latter type of repair device that my invention relates. Heretofore such patches have been composed of a layer of unvulcanized rubber, an adjacent layer of inelastic material, such as canvas, and a backing of material impervious to air, such as vulcanized rubber. A piece of string or thread is attached to the middle layer and is passed through the layer of unvulcanized rubber to serve as a handle in applying the patch. The patch is applied to the interior of the tire at the leak with the unvulcanized rubber next the inner wall of the tire, and heat is applied to make the soft rubber adhere to the tire and close the leak. The layers of rubber are made larger than the inelastic layer to completely cover the edges thereof and prevent entrance of air; but in actual practice I have found that it is impossible to effect an air-tight union between the two layers of rubber. As a consequence the air will work in between the backing and the soft-rubber layer and pass out of the tire through the hole made by the string in the soft rubber and thence through the puncture, so that the tire will not be airtight. In order to obviate this very serious defect and to make a thoroughly successful patch, I inclose an inelastic layer or ply of canvas or similar material between two larger plies of soft unvulcanized rubber, which completely cover the edges of the inelastic fabric. A fourth layer or backing of vulcanized rubber is then applied to the back of the patch to give "life" thereto—that is, to prevent it from remaining doubled up or folded when inserted in the tire. For convenience in handling a string or thread is attached to the inelastic layer and drawn through the outer layer of unvulcanized rubber. The several plies are cemented together, and in applying my patch to the tire the outer layer of soft rubber is placed next the interior of the tire over the leak and heat is applied. As in the style of patch referred to the unvulcanized layer is vulcanized and made to adhere to the tire; but in addition, and a point to be particularly noted, the two layers of soft rubber are vulcanized into one around thin edges, inclosing the inelastic fabric by a seal impervious to the passage of air. Thus it is impossible for air to enter the body of the patch, and consequently it cannot leak out around the string or thread, and a tire thus repaired is as free from leakage as a new or perfectly intact tire.

The drawings show, on an enlarged scale, a patch embodying my invention.

Figure 2:
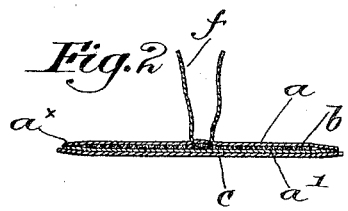
Figure 3:
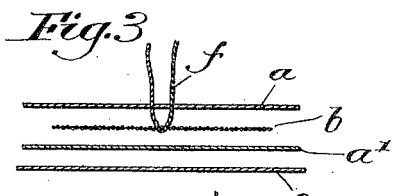
Figure 4:
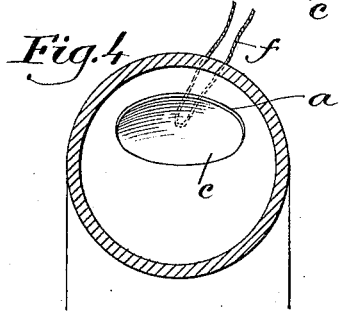

Figure 1 is a top or plan view of a repair-patch embodying my invention, the soft or unvulcanized layers of rubber being partly broken out. Fig. 2 is a transverse sectional view thereof. Fig. 3 is a sectional view showing the several layers composing the patch separated, but in the order of their arrangement; and Fig. 4 is a perspective and sectional detail showing the patch in position in a tire or tube.

The patch comprises two layers $a$ and $a'$ of unvulcanized rubber prepared for vulcanizing, an interposed layer $b$ of inelastic material, such as canvas or other suitable material, and a backing $c$ of vulcanized rubber.

The layers $a$ and $a'$ are larger than the interposed layer $b$ of inelastic material, so that the latter is entirely covered and inclosed by soft or unvulcanized rubber, the annular seal $a^\times$, Fig. 1, preventing the entrance of any air from the tire between and consequent separation of the layers $a$ $b$ $a'$.

I prefer to provide the patch with a handle $f$, shown as a string or thread passed through the soft-rubber layer $a$ and through or into the inelastic layer $b$, but having no connection whatever with the layers $a'$ and $c$.

The usual layers composing the patch are cemented together and held in place, as shown in Fig. 2, until required for use.

When the device is to be used, the patch is inserted in the tire and positioned with the layer $a$ of soft rubber against the interior of the tire at the leak and held in place by the handle $f$. Heat is then applied in any suitable manner to vulcanize the layer $a$, which will adhere tightly to the tire, and at the same time the two layers $a$ and $a'$ are vulcanized and intimately united along their edges, forming a hermetic seal $a^\times$ around the inelastic layer $b$ and absolutely impervious to the entrances of air from the tire. As a consequence the three layers $a\ b\ a'$ cannot be separated and no air can find its way out of the tire around the string when it passes through the layer $a$ and the leak in the tire is effectually sealed. The inelastic layer $b$ prevents the stretching of the patch as a whole and gives it the necessary strength and resistance.

While the backing $c$ is not an essential element of the patch so far as the stoppage of a leak is concerned, yet it is preferable in most instances to use the backing in order that the patch may have that resiliency or life which it would otherwise possess only in a small degree.

Rubber hose may be repaired by the use of my novel repair device.

In some instances the patch may be applied to the tire by means of cement without vulcanization by the use of heat, and in such case the action of the air within the tire will vulcanize together the two layers of unvulcanized rubber, preventing the entrance of air between them, so that the patch can be applied in either manner with great effect.

Having fully described my invention, what I claim as new, and desire to secure by Letters Patent, is—

1. A repair-patch for rubber tires and the like, comprising two layers of unvulcanized rubber, an interposed layer of inelastic material completely inclosed by the layers of rubber, and a backing of resilient material, substantially as described.

2. A repair-patch for rubber tires and the like, comprising two layers of unvulcanized rubber, an interposed layer of inelastic material, and a backing of vulcanized rubber, the edges of the layers of unvulcanized rubber extending beyond the inelastic material to form an annular, hermetic seal around it when the said layers are vulcanized, substantially as described.

3. A repair-patch for rubber tires and the like, comprising two layers of rubber ready for vulcanizing, an interposed smaller layer of strengthening material, a resilient backing, and a thread or string passed through the outer layer of rubber and attached to the strengthening-layer, the layers of rubber extending beyond the edges of said strengthening-layer and adapted to be vulcanized together to hermetically inclose the strengthening-layers, substantially as described.

In testimony whereof I have signed my name to this specification in the presence of two subscribing witnesses.

JAS. F. REYNOLDS.

Witnesses:
W. H. LENT,
GEO. KNOX.